(12) United States Patent
Tsuji

(10) Patent No.: US 12,223,634 B2
(45) Date of Patent: Feb. 11, 2025

(54) INSPECTION APPARATUS, MEASURING METHOD, AND COMPUTER READABLE MEDIUM FOR ACQUIRING POINT CLOUD DATA OF GOOD QUALITY IN PERFORMING MEASUREMENT OF A MEMBER TO BE INSPECTED USING A THREE-DIMENSIONAL SENSOR

(71) Applicant: NEC Corporation, Tokyo (JP)

(72) Inventor: Akira Tsuji, Tokyo (JP)

(73) Assignee: NEC Corporation, Tokyo (JP)

( * ) Notice: Subject to any disclaimer, the term of this patent is extended or adjusted under 35 U.S.C. 154(b) by 545 days.

(21) Appl. No.: 17/625,884

(22) PCT Filed: Jul. 26, 2019

(86) PCT No.: PCT/JP2019/029496
§ 371 (c)(1),
(2) Date: Jun. 29, 2022

(87) PCT Pub. No.: WO2021/019616
PCT Pub. Date: Feb. 4, 2021

(65) Prior Publication Data
US 2022/0358635 A1 Nov. 10, 2022

(51) Int. Cl.
*G06T 7/00* (2017.01)
*G01S 17/89* (2020.01)

(52) U.S. Cl.
CPC ............ *G06T 7/0004* (2013.01); *G01S 17/89* (2013.01); *G06T 2207/10028* (2013.01)

(58) Field of Classification Search
None
See application file for complete search history.

(56) References Cited

U.S. PATENT DOCUMENTS

2016/0377707 A1* 12/2016 Sasaki ..................... G01S 17/89
356/4.01
2017/0219336 A1* 8/2017 Kurtz ................. G01B 11/0616
2018/0087901 A1* 3/2018 Komeichi ............ G01C 15/002

FOREIGN PATENT DOCUMENTS

JP 2010-271066 A 12/2010
JP 2013-045141 A 3/2013
(Continued)

OTHER PUBLICATIONS

International Search Report for PCT Application No. PCT/JP2019/029496, mailed on Oct. 21, 2019.

*Primary Examiner* — Akwasi M Sarpong
*Assistant Examiner* — Pawan Dhingra
(74) *Attorney, Agent, or Firm* — Sughrue Mion, PLLC

(57) ABSTRACT

An inspection apparatus (10) includes: a three-dimensional sensor (11) configured to irradiate a member to be inspected with a beam and acquire point cloud data of the member to be inspected based on at least amplitude information of light; a direction identifying unit (12) configured to identify a predetermined direction in which there are the largest number of the point cloud data in the reference coordinate system which is coordinate axes for the member to be inspected; and a tilt amount determination unit (13) configured to determine a tilt amount for changing an arrangement of the reference coordinate system so that the number of the point cloud data in the predetermined direction increases in the eigen coordinate system which is coordinate axes for the three-dimensional sensor (11).

10 Claims, 12 Drawing Sheets

(56) References Cited

FOREIGN PATENT DOCUMENTS

| | | |
|---|---|---|
| JP | 2014-137244 A | 7/2014 |
| JP | 2017-150977 A | 8/2017 |
| JP | 2018-065171 A | 4/2018 |
| WO | WO-2022024259 A1 * | 2/2022 |

* cited by examiner

INSPECTION APPARATUS, MEASURING METHOD, AND COMPUTER READABLE MEDIUM FOR ACQUIRING POINT CLOUD DATA OF GOOD QUALITY IN PERFORMING MEASUREMENT OF A MEMBER TO BE INSPECTED USING A THREE-DIMENSIONAL SENSOR

This application is a National Stage Entry of PCT/JP2019/029496 filed on Jul. 26, 2019, the contents of all of which are incorporated herein by reference, in their entirety.

TECHNICAL FIELD

The present disclosure relates to an inspection apparatus, a measuring method, and a computer-readable medium.

BACKGROUND ART

A technique for estimating a three-dimensional shape of a member to be inspected using point cloud data acquired by irradiating the member to be inspected with a beam is known. Patent Literature 1 discloses a technique for creating a three-dimensional map based on the point cloud data acquired by a surface state sensor for detecting a surface state of an inner surface of a piping and a laser irradiation unit configured to irradiate a laser light, and estimating a location of oneself from the created three-dimensional map.

CITATION LIST

Patent Literature

Patent Literature 1: Japanese Unexamined Patent Application Publication No. 2018-065171

SUMMARY OF INVENTION

Technical Problem

It is known that in performing measurement of a member to be inspected using a three-dimensional sensor, the quality of the acquired point cloud data changes depending on how the three-dimensional sensor is placed with respect to the member to be inspected. There is a problem that when the quality of the acquired point cloud data is inadequate, the three-dimensional shape of the member to be inspected cannot be estimated accurately.

The present disclosure has been made in view of the background mentioned above, and an object of the present disclosure is to provide an inspection apparatus capable of acquiring point cloud data of good quality in performing measurement of a member to be inspected using a three-dimensional sensor.

Solution to Problem

A first example aspect of the present disclosure is an inspection apparatus including:

a three-dimensional sensor configured to irradiate a member to be inspected with a beam and acquire point cloud data of the member to be inspected based on at least amplitude information of light;

a direction identifying unit configured to identify a predetermined direction in which there are the largest number of the point cloud data in the reference coordinate system which is coordinate axes for the member to be inspected; and a tilt amount determination unit configured to determine a tilt amount for changing an arrangement with respect to the reference coordinate system so that the number of the point cloud data in the predetermined direction increases in the eigen coordinate system which is coordinate axes for the three-dimensional sensor.

A second example aspect of the present disclosure is a measuring method including:

a first step of, performed by a three-dimensional sensor adapted to acquire point cloud data based on at least amplitude information of light, irradiating a member to be inspected with a beam and acquiring the point cloud data;

a second step of identifying a predetermined direction in which there are the largest number of the point cloud data in the reference coordinate system which is coordinate axes for the member to be inspected; and a third step of determining a tilt amount for changing an arrangement with respect to the reference coordinate system so that the number of the point cloud data in the predetermined direction increases in the eigen coordinate system which is coordinate axes for the three-dimensional sensor.

A third example aspect of the present disclosure is a non-transitory computer-readable medium storing a program for causing a computer to execute:

a first step of, performed by a three-dimensional sensor adapted to acquire point cloud data based on at least amplitude information of light, irradiating a member to be inspected with a beam and acquiring the point cloud data;

a second step of identifying a predetermined direction in which there are the largest number of the point cloud data in the reference coordinate system which is coordinate axes for the member to be inspected; and a third step of determining a tilt amount for changing an arrangement with respect to the reference coordinate system so that the number of the point cloud data in the predetermined direction increases in the eigen coordinate system which is coordinate axes for the three-dimensional sensor.

Advantageous Effects of Invention

According to the present disclosure, it is possible to acquire point cloud data of good quality in performing measurement of a member to be inspected using a three-dimensional sensor.

DESCRIPTION OF EMBODIMENTS

Figure 1:
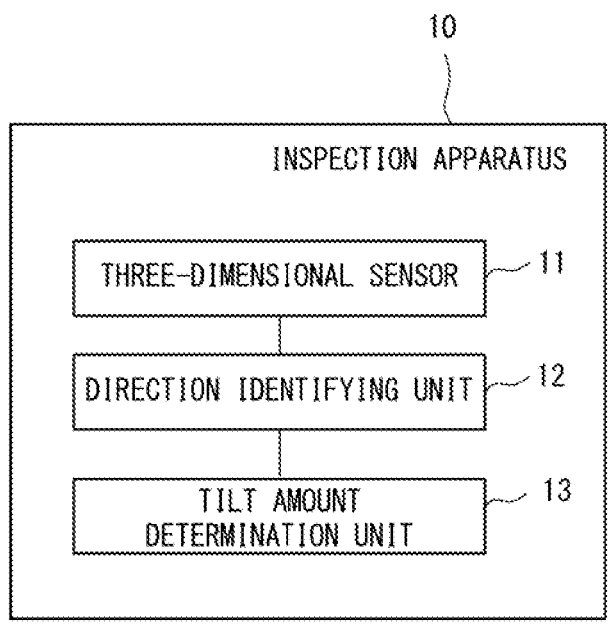
FIG. 1 is a block diagram showing a configuration of an inspection apparatus according to a first example embodiment.

Example embodiments of the present disclosure will be described below with reference to the drawings. For clarity of description, the following descriptions and drawings have been omitted and simplified as appropriate. In each of the drawings, the same elements are denoted by the same reference numerals, and redundant descriptions are omitted as necessary.

First Example Embodiment

A first example embodiment will be described below.

FIG. 1 is a block diagram showing a configuration of an inspection apparatus 10 according to a first example embodiment. As shown in FIG. 1, the inspection apparatus 10 includes a three-dimensional sensor 11, a direction identifying unit 12, and a tilt amount determination unit 13.

The three-dimensional sensor 11 emits a beam onto a member to be inspected and acquires point cloud data of the member to be inspected based on at least amplitude information of light. The direction identifying unit 12 identifies the predetermined direction in which there are the largest number of point cloud data in the reference coordinate system which is the coordinate axes for the member to be inspected. The tilt amount determination unit 13 determines a tilt amount for changing an arrangement with respect to the reference coordinate system so that the number of point cloud data in the predetermined direction increases in the eigen coordinate system which is the coordinate axes for the three-dimensional sensor 11.

In this way, the point cloud data of good quality can be acquired in performing measurement of a member to be inspected using the three-dimensional sensor 11.

Second Example Embodiment

A second example embodiment will be described below.

Figure 2:
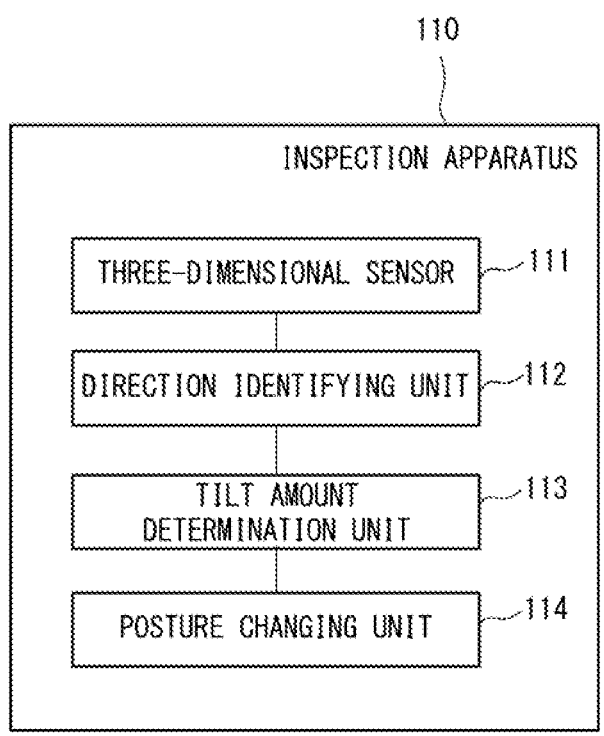
FIG. 2 is a block diagram showing a configuration of an inspection apparatus according to a second example embodiment.

First, a configuration of an inspection apparatus according to the second example embodiment will be described. FIG. 2 is a block diagram showing a configuration of an inspection apparatus 110 according to the second example embodiment. As shown in FIG. 2, the inspection apparatus 110 includes a three-dimensional sensor 111, a direction identifying unit 112, a tilt amount determination unit 113, and a posture changing unit 114.

The three-dimensional sensor 111 emits a beam onto a member to be inspected to thereby acquire point cloud data of the member to be inspected based on at least amplitude information of light. The three-dimensional sensor 111 is, for example, a 3D-LiDAR (Light Detection and Ranging) sensor.

Figure 3:
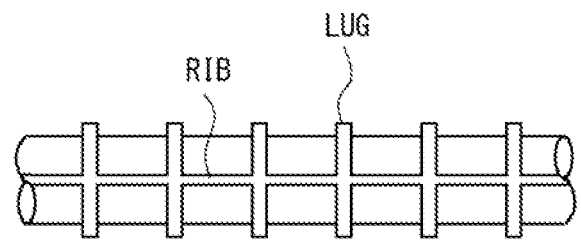
FIG. 3 is a schematic diagram showing an outer shape of a deformed steel bar which is a reinforcing bar serving as a member to be inspected by the inspection apparatus according to the second example embodiment.

Here, the members to be inspected are reinforcing bars called deformed steel bars (also called deformed reinforcing bars). FIG. 3 is a schematic diagram showing an outer shape of one of the deformed steel bars. As shown in FIG. 3, the deformed steel bar is provided with uneven projections called "ribs" and "lugs" on its surface. Standard names such as "D10", "D13", "D16", and "D19" are given to the deformed steel bars depending on their respective diameters. The numbers in the standard names indicate approximate diameters of the deformed steel bars, for example, the diameter of D10 is 9.53 mm and the diameter of D13 is 12.7 mm. That is, the diameters of the deformed steel bars are standardized at intervals of 2 to 3 mm.

Referring again to FIG. 2, the direction identifying unit 112 detects the reference direction which is the predetermined direction in which there are the largest number of points in the point cloud data. The direction identifying unit 112 detects the reference direction based on a distribution of the point cloud data. Here, the distribution of the point cloud data is variances of the points in the point cloud data. The tilt amount determination unit 113 determines the tilt amount for tilting the eigen three-dimensional orthogonal coordinate system serving as an eigen coordinate system with respect to the reference three-dimensional orthogonal coordinate system serving as a reference coordinate system so that the number of points in the point cloud data increases. The posture changing unit 114 tilts the three-dimensional sensor with respect to the reference three-dimensional orthogonal coordinate system in accordance with the tilt amount.

Next, a reference three-dimensional orthogonal coordinate system and an eigen three-dimensional orthogonal coordinate system will be described.

The reference three-dimensional orthogonal coordinate system is a three-dimensional orthogonal coordinate used as a reference and remains unchanged even when the posture of the three-dimensional sensor 111 changes. The eigen three-dimensional orthogonal coordinate system is a three-dimensional orthogonal coordinate system unique to the three-dimensional sensor 111 and changes following the change in the posture of the three-dimensional sensor 111.

Figure 4:
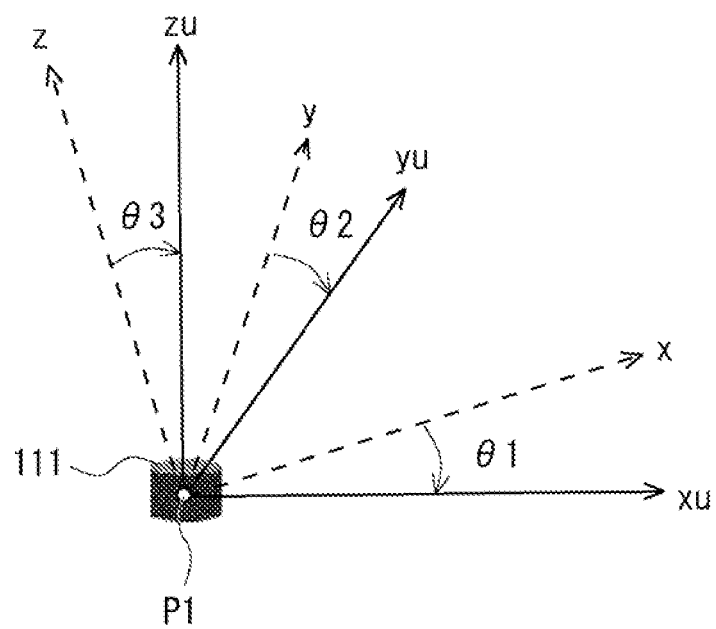
FIG. 4 is a schematic diagram for explaining a reference three-dimensional orthogonal coordinate system and an eigen three-dimensional orthogonal coordinate system.

FIG. 4 is a schematic diagram for explaining the reference three-dimensional orthogonal coordinate system and the eigen three-dimensional orthogonal coordinate system. As shown in FIG. 4, the reference three-dimensional orthogonal coordinate system is composed of an x-axis as a first axis, a y-axis as a second axis, and a z-axis as a third axis. On the other hand, the eigen three-dimensional coordinate system is composed of an xu-axis as a fourth axis, a yu-axis as a fifth axis, and a zu-axis as a sixth axis. Both the reference three-dimensional orthogonal coordinate system and the eigen three-dimensional orthogonal coordinate system have an origin at a reference point P1 of the three-dimensional sensor 111. The shift in the angle of the xu-axis with respect to the x-axis is denoted by θ1, the shift in the angle of the yu-axis with respect to the y-axis is denoted by θ2, and the shift in the angle of the xu-axis with respect to the x-axis is denoted by θ3. The tilt amount of the eigen three-dimensional orthogonal coordinate system with respect to the reference three-dimensional orthogonal coordinate system can be expressed as, for instance, (θ1, θ2, θ3).

Figure 5:
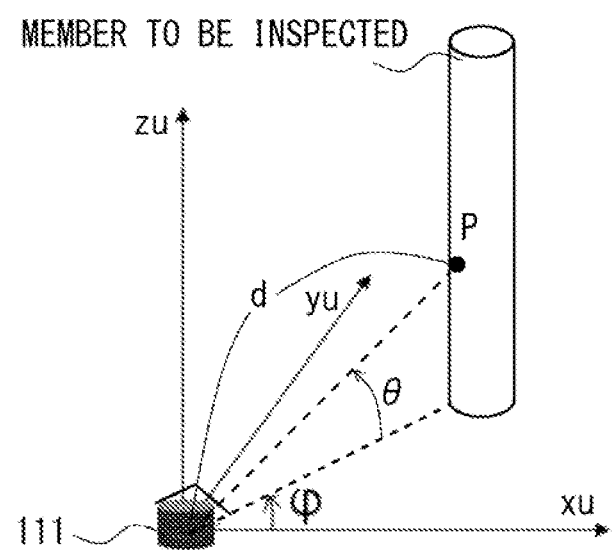
FIG. 5 is a schematic diagram for explaining an irradiation direction of a beam emitted from a three-dimensional sensor.

FIG. 5 is a schematic diagram for explaining an irradiation direction of a beam emitted from the three-dimensional sensor 111. As shown in FIG. 5, it is assumed that a representative point of a part of the member to be inspected where the beam emitted from the three-dimensional sensor 111 hits is a point P. The aforementioned eigen three-dimensional orthogonal coordinate system can be transformed into a polar coordinate display (hereinbelow, an eigen three-dimensional orthogonal coordinate system transformed into a polar coordinate display is referred to as an eigen three-dimensional polar coordinate system). The point P is expressed as (xu, yu, zu) in the eigen three-dimensional orthogonal coordinate system and as (d, φ, θ) in the eigen three-dimensional polar coordinate system. Here, d denotes a distance from the origin to the point P, i.e., a moving radius. φ is an angle formed by the x-axis and a projection of a radius vector (a vector from the origin to the point P) onto a plane including the xu-axis and the yu-axis. θ is an angle formed by a plane including the xu-axis and the yu-axis and the radius vector. The relations of xu=d·cos θ·cos φ, yu=d·cos θ·sin φ, and zu=d·sin θ hold. Note that the representative point where the beam hits the member to be inspected shall be on an optical axis of the beam.

Figure 6:
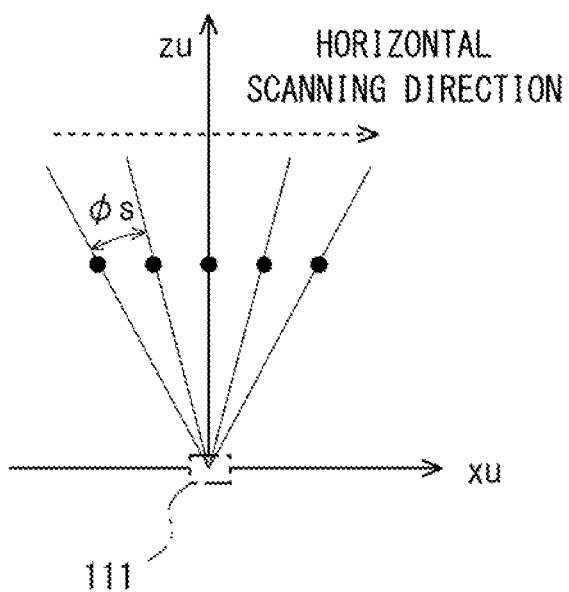
FIG. 6 shows schematic diagrams each for explaining a scanning direction of a beam emitted from a three-dimensional sensor.
Figure 6:
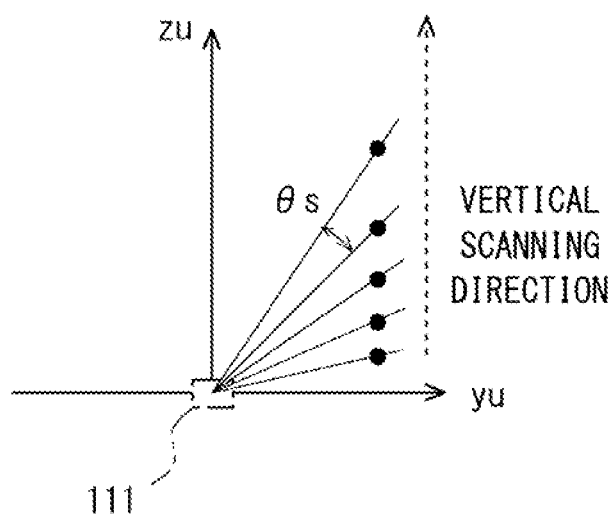

FIG. 6 show schematic diagrams each explaining a scanning direction of a beam emitted from the three-dimensional sensor 111. As shown in FIG. 6, the scanning directions of the beam emitted from the three-dimensional sensor 111 are, for instance, a direction parallel to the xu-axis of the eigen three-dimensional orthogonal coordinate system (a horizontal scanning direction) and a direction parallel to the zu-axis of the eigen three-dimensional orthogonal coordinate system (a vertical scanning direction). The beam emitted from three-dimensional sensor 111 has a resolution (a pitch angle) of φs in the horizontal scanning direction and a resolution (a pitch angle) of θs in the vertical scanning direction. The smaller the pitch angle, the higher the resolution in each scanning direction becomes.

Next, an explanation will be given on the flow of processing for tilting the three-dimensional sensor 111 so that point cloud data of good quality can be acquired in performing measurement of a member to be inspected using the three-dimensional sensor 111 in the inspection apparatus 110. Note that in the following description, FIG. 2 is also referred to as appropriate.

Figure 7:
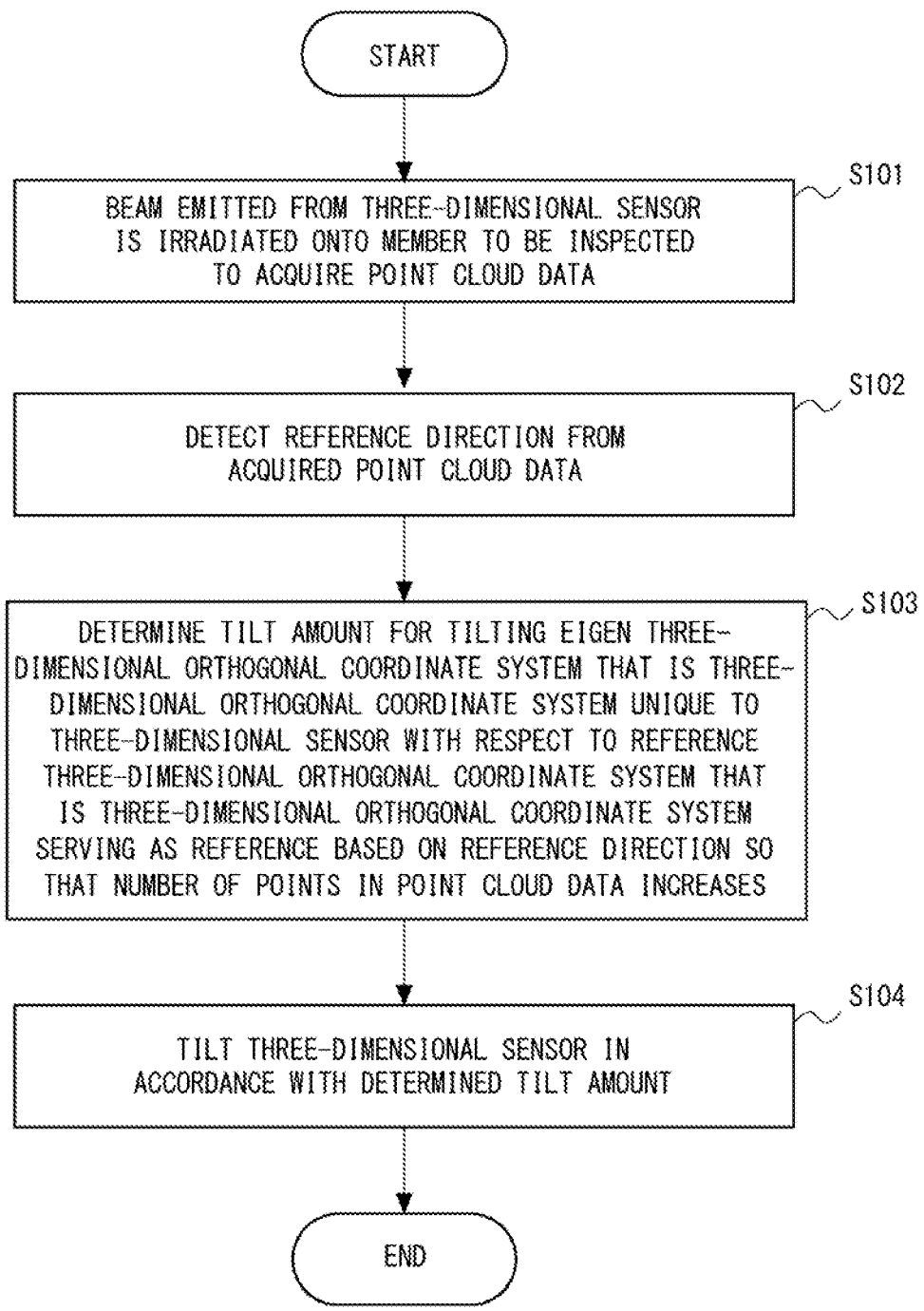
FIG. 7 is a flowchart for explaining a flow of processing for tilting a three-dimensional sensor so that point cloud data of good quality can be acquired in performing measurement of a member to be inspected using the three-dimensional sensor in the inspection apparatus according to the second example embodiment.

FIG. 7 is a flowchart for explaining a flow of processing for tilting the three-dimensional sensor 111 so that point cloud data of good quality can be acquired in performing measurement of a member to be inspected using the three-dimensional sensor 111 in the inspection apparatus 110. As shown in FIG. 7, first, a beam emitted from the three-dimensional sensor 111 is irradiated onto a member to be inspected to thereby acquire point cloud data (Step S101). Next, the direction identifying unit 112 detects, from the acquired point cloud data, the reference direction which is the direction in which there are the largest number of points in the point cloud data (Step S102). Next, the tilt amount determination unit 113 determines, based on the reference direction, the tilt amount for tilting the eigen three-dimensional orthogonal coordinate system that is a three-dimensional orthogonal coordinate system unique to the three-dimensional sensor with respect to the reference three-dimensional orthogonal coordinate system that is a three-dimensional orthogonal coordinate system serving as the reference so that the number of points in the point cloud data increases (Step S103). Next, the posture changing unit 114 tilts the three-dimensional sensor 111 in accordance with the determined tilt amount (Step S104).

Next, a method of detecting the reference direction in Step S102 of FIG. 7 will be described in detail.

As a method of detecting the reference direction in Step S102 of FIG. 7, the Principal Component Analysis (PCA) method can be employed. In the principal component analysis method, the eigenvalues of the principal components (eigenvectors) are the variances. In the principal component analysis method, the principal components are referred to as a first principal component, a second principal component, and so forth in the order of the eigenvalues. The three principal components of the first principal component, the second principal component, and the third principal component can be obtained since the point cloud data of the member to be inspected is composed of three parameters (x, y, z).

Figure 8:
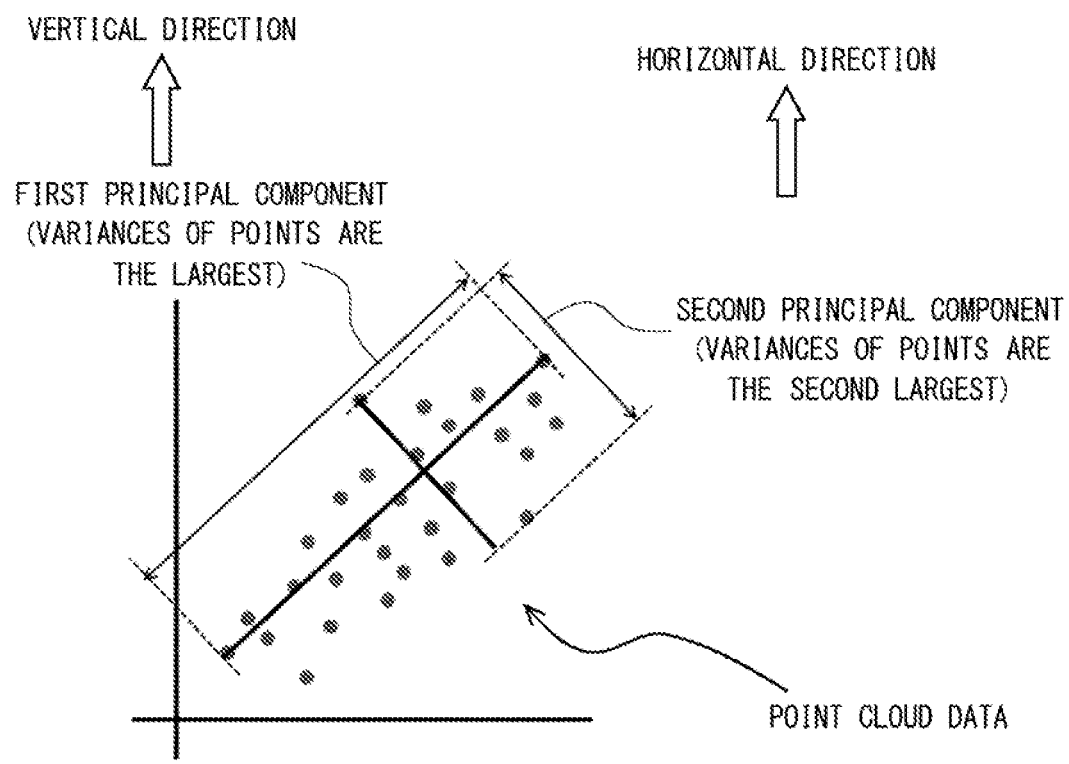
FIG. 8 is a schematic diagram for explaining a method of detecting, by the principal component analysis method, a reference direction from the point cloud data of a member to be inspected.

FIG. 8 is a schematic diagram for explaining a method of detecting, by the principal component analysis method, a reference direction from the point cloud data of a member to be inspected. As described above, the reference direction is the direction in which there are the largest number of points in the point cloud data acquired from the member to be inspected. As shown in FIG. 8, in the principal component analysis method, the eigenvalues of the principal components corresponding to the variances of the points become the largest in the reference direction which is the direction in which there are the largest number of points in the point cloud data. That is, the first principal component in which the eigen value of the principal component becomes the largest is the reference direction. Therefore, by detecting the first principal component using the principal component analysis method, the reference direction can be detected.

Next, the method of determining the tilt amount based on the reference direction in Step S103 of FIG. 7 will be described.

Figure 9:
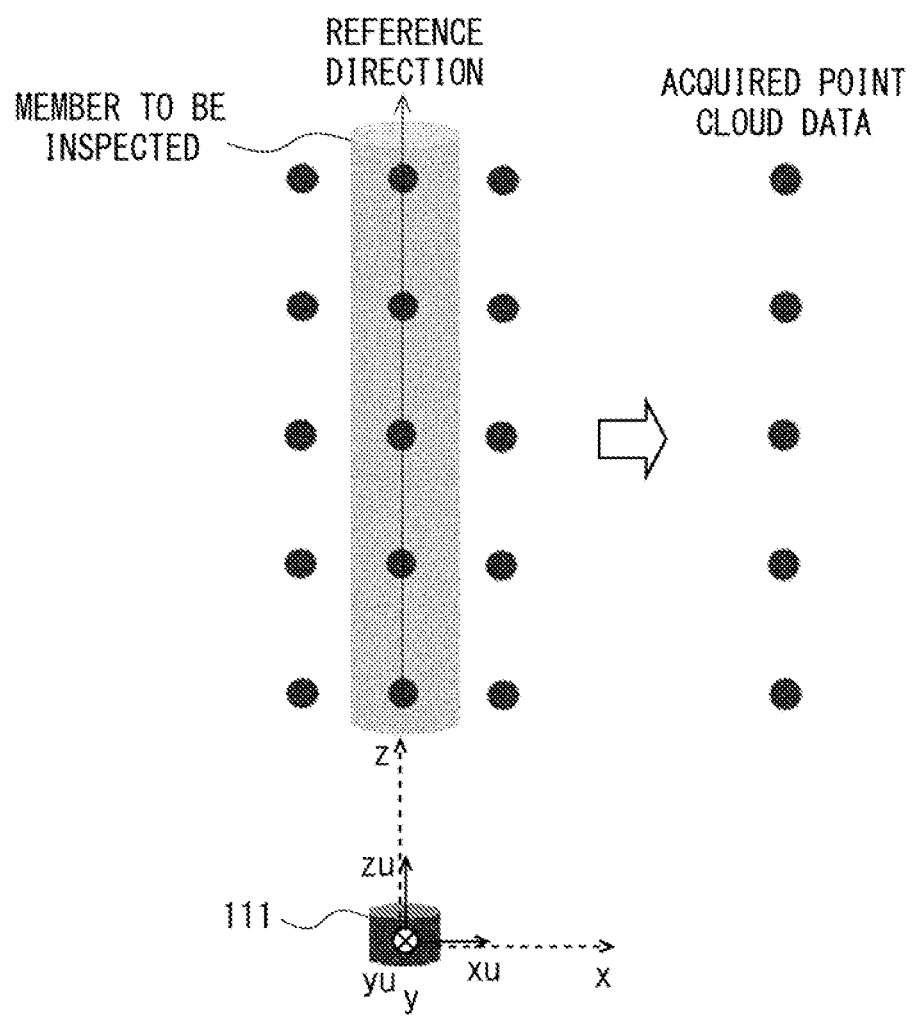
FIG. 9 is schematic diagram for explaining a method of determining a tilt amount based on the reference direction in Step S103 of FIG. 7.
Figure 10:
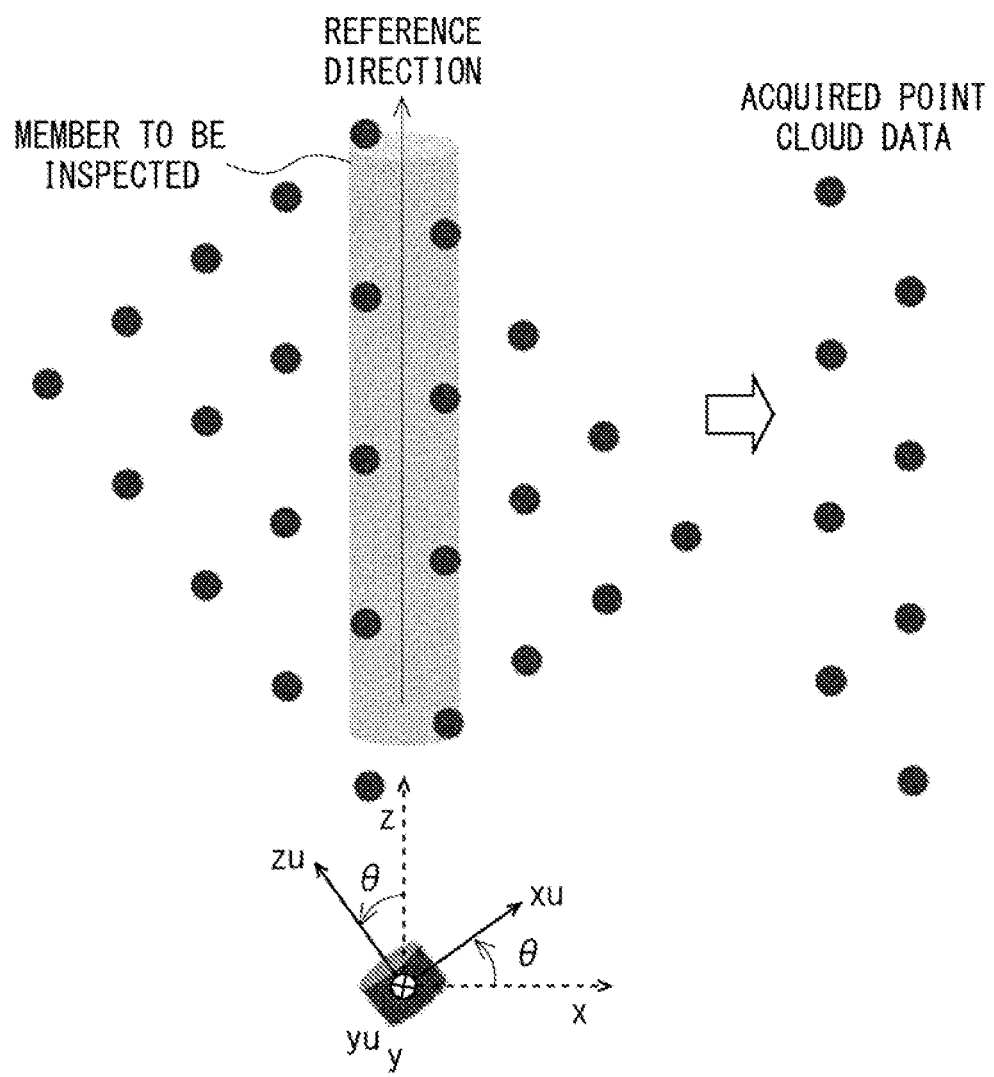
FIG. 10 is schematic diagram for explaining a method of determining a tilt amount based on the reference direction in Step S103 of FIG. 7.

FIG. 9 and FIG. 10 are schematic diagrams each explaining a method of determining a tilt amount based on the reference direction in Step S103 of FIG. 7. As shown in FIG. 9, first, assume that the eigen three-dimensional orthogonal coordinate system coincides with the reference three-dimensional coordinate system. Further, assume that the reference direction coincides with the z-axis direction of the reference three-dimensional orthogonal coordinate system.

From this state, the three-dimensional sensor 111 is tilted with the y-axis as the rotation axis so that the zu-axis of the eigen three-dimensional orthogonal coordinate system is inclined by θ in the reference direction as shown in FIG. 10. Tilting of the three-dimensional sensor 111 is performed by the posture changing unit 114 (see, FIG. 2). This angle θ is determined so that the number of points in the point cloud data of the member to be inspected increases.

In the example shown here, the tilt amount is determined so that the state shown in FIG. 9, in which the number of points in the point cloud data acquired based on the member to be inspected is five, changes to the state shown in FIG. 10, in which the number of points in the point cloud data acquired based on the member to be inspected is eight. Further, in the example shown here, since the three-dimensional sensor 111 is tilted with the y-axis as the rotation axis, the tilt amounts (θ1, θ2, θ3) of the eigen three-dimensional orthogonal coordinate system with respect to the reference three-dimensional orthogonal coordinate system described with reference to FIG. 4 are (θ, 0, θ). Note that the tilt angle is positive in the clockwise direction and negative in the anticlockwise direction. That is, in the example shown here, θ is negative.

In determining the tilt amount, θ may be set in increments of, for instance, 15°, e.g. +/−15°, +/−30°, +/−45°, +/−60°, and the tilt amount θ at which there is the largest number of points in the point cloud data of the member to be inspected may be found. In this way, the optimal tilt amount can be determined efficiently.

When the number of the point cloud data acquired from the member to be inspected increases, it is possible to perform measurement of the member to be inspected more accurately. As described above, in the inspection apparatus 110 according to the present example embodiment, the tilt amount is determined so that the number of point cloud data acquired from the member to be inspected increases and the three-dimensional sensor 111 is tilted with respect to the reference three-dimensional orthogonal coordinate system in accordance with the determined tilt amount. Accordingly, point cloud data of good quality can be acquired in performing measurement of a member to be inspected using the three-dimensional sensor 111.

Figure 11:
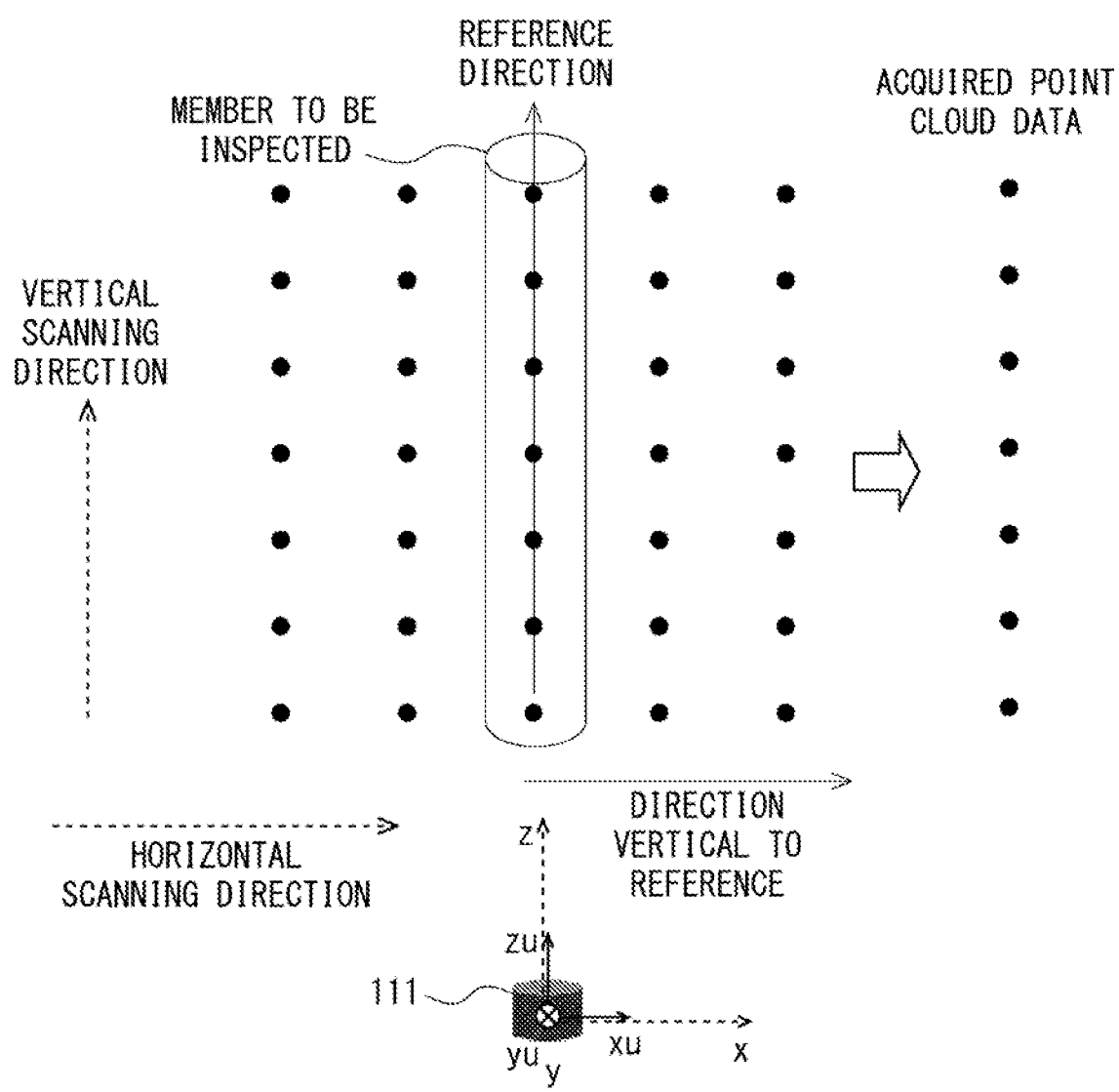
FIG. 11 is a schematic diagram for explaining another method of determining a tilt amount based on the reference direction in Step S103 of FIG. 7.
Figure 12:
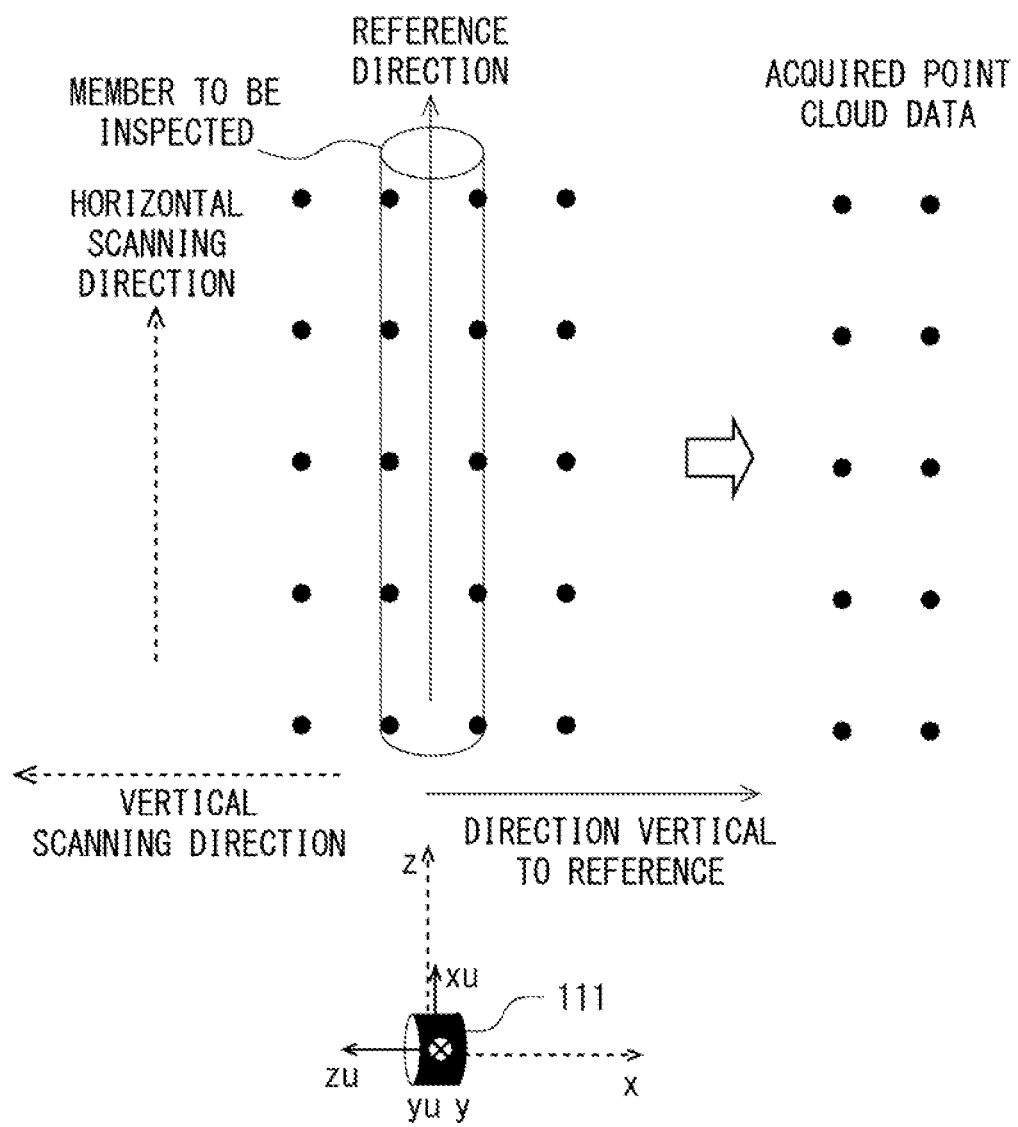
FIG. 12 is a schematic diagram for explaining another method of determining a tilt amount based on the reference direction in Step S103 of FIG. 7.

FIG. 11 and FIG. 12 are schematic diagrams each explaining another method of determining a tilt amount based on the reference direction in Step S103 of FIG. 7. Here, assume that the member to be inspected has a length that is sufficiently long in the reference direction and a length that is markedly short in the direction vertical to the reference direction compared to the length in the reference direction, like a reinforcing bar. Further, the resolution of the beam emitted from the three-dimensional sensor 111 is higher in the vertical scanning direction than that in the horizontal scanning direction.

As shown in FIG. 11, when the three-dimensional sensor 111 is installed so that the vertical scanning direction in which the resolution is the highest becomes horizontal to the reference direction, many points are aligned in the reference direction whereas only one point is present in the direction vertical to the reference direction in the acquired point cloud data. That is, in the acquired point cloud data, the number of points in the direction vertical to the reference direction decreases markedly compared to the number of points in the reference direction.

Therefore, as shown in FIG. 12, the tilt amount is determined so that the reference direction and the vertical scanning direction which is the direction in which the resolution is the highest among the scanning directions of the beam emitted from the three-dimensional sensor 111 are orthogonal. In this example, the tilt amounts (θ1, θ2, θ3) of the eigen three-dimensional orthogonal coordinate system with respect to the reference three-dimensional orthogonal coordinate system are (−90°, 0, −90°). Accordingly, the number of points in the direction vertical to the reference direction can be increased.

As described above, when the member to be inspected has a length that is sufficiently long in the reference direction and a length that is markedly short in the direction vertical to the reference direction, the tilt amount is determined so that the reference direction and the direction in which the resolution is the highest among the scanning directions of the beam emitted from the three-dimensional sensor 111 are orthogonal. Accordingly, in performing measurement of a member to be inspected using the three-dimensional sensor 111, point cloud data of good quality can be acquired.

MODIFIED EXAMPLE 1

Another example of a flow of processing for tilting the three-dimensional sensor 111 so that the point cloud data of good quality can be acquired in performing measurement of a member to be inspected using the three-dimensional sensor 111 in the inspection apparatus 110 will be described. Note that in the following description, FIG. 2 is also referred to as appropriate.

Figure 13:
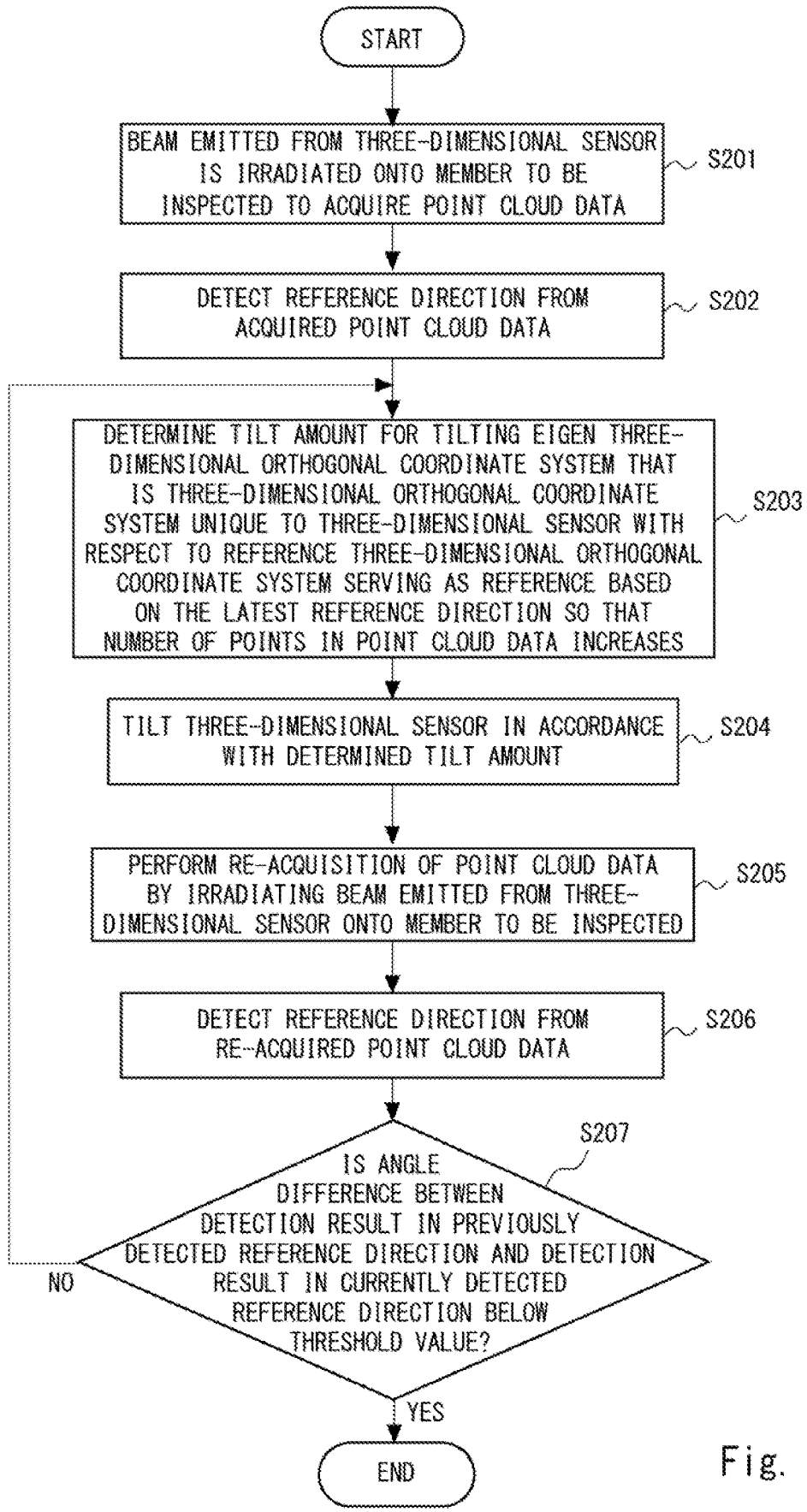
FIG. 13 explains another example of a flow of processing for tilting a three-dimensional sensor so that point cloud data of good quality can be acquired in performing measurement of a member to be inspected using the three-dimensional sensor in an inspection apparatus.

FIG. 13 is a flowchart for explaining another example of a flow of processing for tilting the three-dimensional sensor 111 so that point cloud data of good quality can be acquired in performing measurement of a member to be inspected using the three-dimensional sensor 111 in the inspection apparatus 110. As shown in FIG. 13, first, a beam emitted from the three-dimensional sensor 111 capable of acquiring point cloud data based on at least amplitude information of light is irradiated onto a member to be inspected to thereby acquire point cloud data (Step S201). Next, the reference direction is detected from the acquired point cloud data (Step S202). Next, the tilt amount for tilting the eigen three-dimensional orthogonal coordinate system that is a three-dimensional orthogonal coordinate system unique to the three-dimensional sensor with respect to the reference three-dimensional orthogonal coordinate system serving as the reference is determined based on the latest reference direction so that the number of points in the point cloud data increases (Step S203). Next, the posture changing unit 114 tilts the three-dimensional sensor 111 in accordance with the determined tilt amount (Step S204).

Following Step S204, the three-dimensional sensor 111 performs re-acquisition of the point cloud data of the member to be inspected (Step S205). Next, the direction identifying unit 112 detects the reference direction from the re-acquired point cloud data (Step S206). Next, the posture changing unit 114 determines whether or not the angle difference between the detection result in the previously detected reference direction and the detection result in the currently detected reference direction is below the threshold value (Step S207). In Step S207, when the angle difference between the detection result in the previously detected reference direction and the detection result in the currently detected reference direction is below the threshold value, the processing is ended. In Step S207, when the angle difference between the detection result in the previously detected reference direction and the detection result in the currently detected reference direction is equal to or greater than the threshold value, the processing returns to Step S203. By performing the processing for tilting the three-dimensional sensor 111 as described above, in performing measurement of a member to be inspected using the three-dimensional sensor 111, point cloud data of better quality can be acquired.

Example Embodiment 3

Hereinbelow, a third example embodiment will be described.

Figure 14:
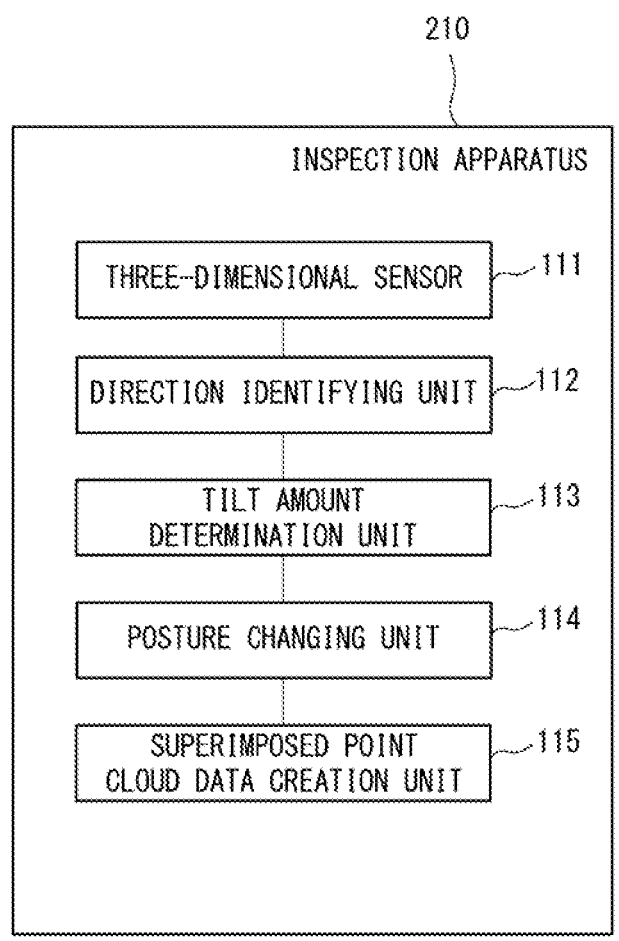
FIG. 14 is a block diagram showing a configuration of an inspection apparatus according to a third example embodiment.

FIG. 14 is a block diagram showing a configuration of an inspection apparatus 210 according to a third example embodiment. As shown in FIG. 14, the inspection apparatus 210 includes the three-dimensional sensor 111, the direction identifying unit 112, the tilt amount determination unit 113, and a superimposed point cloud data creation unit 115. That is, the inspection apparatus 210 differs from the inspection apparatus 110 shown in FIG. 2 only in that the inspection apparatus 210 includes the superimposed point cloud data creation unit 115. The superimposed point cloud data creation unit 115 creates superimposed point cloud data in which the cloud data acquired plural times by the three-dimensional sensor 111 are superimposed on one another. In this way, in performing measurement of members to be inspected using the three-dimensional sensor 111, point cloud data of better quality can be acquired.

In the above example embodiments, the present disclosure has been described as a hardware configuration, but the present disclosure is not limited thereto. It is also possible to implement each processing by causing a CPU (Central Processing Unit) to execute a program.

The program for implementing the above processing can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the example embodiments, the present disclosure is not limited to the above. The configurations and details of the present disclosure can be modified in various ways that can be understood by those skilled in the art within the scope of the disclosure.

REFERENCE SIGNS LIST 10, 110, 210 INSPECTION APPARATUS
11, 111 THREE-DIMENSIONAL SENSOR
12, 112 DIRECTION IDENTIFYING UNIT
13, 113 TILT AMOUNT DETERMINATION UNIT
114 POSTURE CHANGING UNIT
115 SUPERIMPOSED POINT CLOUD DATA CREATION UNIT

The invention claimed is:

1. An inspection apparatus comprising:
a three-dimensional sensor configured to irradiate a member to be inspected with a beam and acquire point cloud data of the member to be inspected based on at least amplitude information of light; wherein the inspection apparatus is configured to:
identify a predetermined direction in which there are a largest number of the point cloud data in a reference coordinate system being coordinate axes for the member to be inspected; and
determine a tilt amount for changing an arrangement with respect to the reference coordinate system so that a number of the point cloud data in the predetermined direction increases in an eigen coordinate system being coordinate axes for the three-dimensional sensor.

2. The inspection apparatus according to claim 1, further configured to change a posture of the three-dimensional sensor so that the eigen coordinate system tilts with respect to the reference coordinate system in accordance with the tilt amount.

3. The inspection apparatus according to claim 2, further configured to:
perform re-acquisition of the point cloud data of the member to be inspected after a change of the posture of the three-dimensional sensor;
perform re-detection of the predetermined direction based on the re-acquired point cloud data;
re-determine the tilt amount when the angle difference is equal to or greater than a threshold, value; and
change, when of the tilt amount has been re-determined, the posture of the three-dimensional sensor in accordance with the re-determined tilt amount, wherein
the inspection apparatus is configured not to re-determine the tilt amount when an angle difference between a detection result in the previously predetermined direction and a detection result in the currently predetermined direction is less than the threshold value.

4. The inspection apparatus according to claim 1, further configured to detect the predetermined direction based on a distribution of the point cloud data.

5. The inspection apparatus according to claim 4, wherein the distribution is a variance.

6. The inspection apparatus according to claim 1, further configured to determine the tilt amount so that the predetermined direction and the direction in which a resolution is the highest among the scanning directions of the beam emitted from the three-dimensional sensor are orthogonal.

7. The inspection apparatus according to claim 1, further configured to create superimposed point cloud data in which the point cloud data acquired more than one time by the three-dimensional sensor are superimposed on one another.

8. The inspection apparatus according to any one of claims 1 to 7, wherein the member to be inspected is a deformed steel bar.

9. A measuring method comprising:
by a three-dimensional sensor adapted to acquire point cloud data based on at least amplitude information of light, irradiating a member to be inspected with a beam and acquiring the point cloud data;
identifying a predetermined direction in which there are a largest number of the point cloud data in a reference coordinate system being coordinate axes for the member to be inspected; and
determining a tilt amount for changing an arrangement with respect to the reference coordinate system so that a number of the point cloud data in the predetermined direction increases in an eigen coordinate system being coordinate axes for the three-dimensional sensor.

10. A non-transitory computer-readable medium storing a program for causing a computer to:
cause a three-dimensional sensor adapted to acquire point cloud data based on at least amplitude information of light to irradiate-a member to be inspected with a beam and acquiring the point cloud data;
identify a predetermined direction in which there are a largest number of the point cloud data in a reference coordinate system being coordinate axes for the member to be inspected; and
determine a tilt amount for changing an arrangement with respect to the reference coordinate system so that number of the point cloud data in the predetermined direction increases in an eigen coordinate system being coordinate axes for the three-dimensional sensor.

* * * * *